May 6, 1958  L. S. PRUITT  2,833,563

TELESCOPING TRAILER HITCH

Filed March 26, 1956

INVENTOR.
Lloyd S. Pruitt.
BY
Fishburn & Gold
ATTORNEYS.

United States Patent Office 2,833,563
Patented May 6, 1958

2,833,563

TELESCOPING TRAILER HITCH

Lloyd S. Pruitt, Parsons, Kans.

Application March 26, 1956, Serial No. 573,662

2 Claims. (Cl. 280—482)

This invention relates to trailer hitches, and more particularly to a hitch having connection with the drawbar of a tractor or the like and being adapted for connection with the tongue of a trailer or other vehicle.

Heretofore in trailer hitches it has been necessary to maneuver the tractor in a position to be quite exacting and in alignment with the trailer or other vehicle to be connected therewith, and quite often necessitates the maneuvering of the trailer in a certain position with respect to the trailer.

It is the principal object of the present invention to provide a hitch for connecting trailers and other vehicles to tractors in which the two devices need not necessarily be in close alignment one with the other.

Other objects of the invention are to provide telescoping members for connecting the tractor to the trailer or other vehicle; to provide a swinging coupling connection on the drawbar of the tractor to which a tubular member is attached; to provide the outer end of the tubular member with a spring-urged latch mechanism or detent; to provide a tubular member connected to the tongue or hitch connection of the trailer or other vehicle of slightly larger diameter than the tubular member attached to the tractor whereby the first tubular member will be telescoped within the second tubular member and the latch connection will be engaged with the end of the second tubular member and the spring urge the latch in position; to provide means for safety locking of the telescoping members together; and to provide a device of this character simple and economical to manufacture.

In accomplishing these and other objects of the invention, I have provided improved details of structure, the preferred form of which is shown in the accompanying drawings, wherein.

Figure 1:
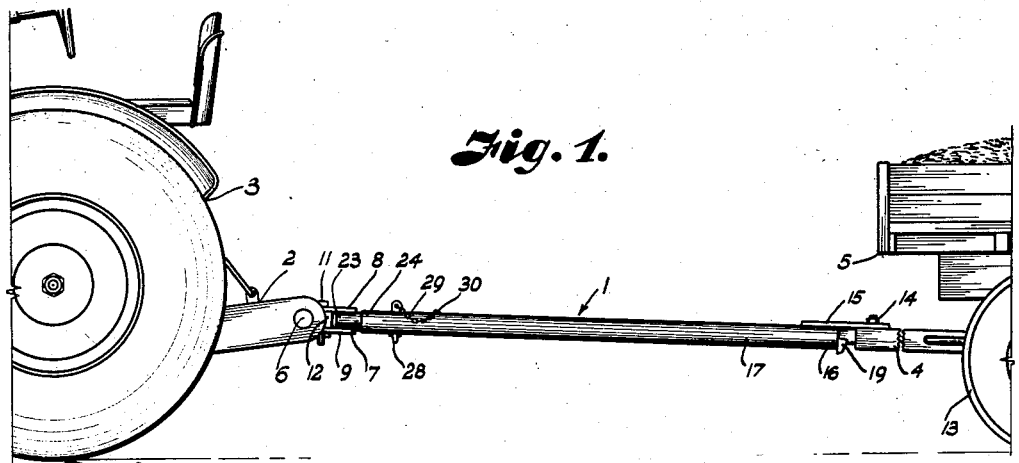
Fig. 1 is a side view of my hitch shown attached to the tractor and the trailer vehicle.
Figure 2:
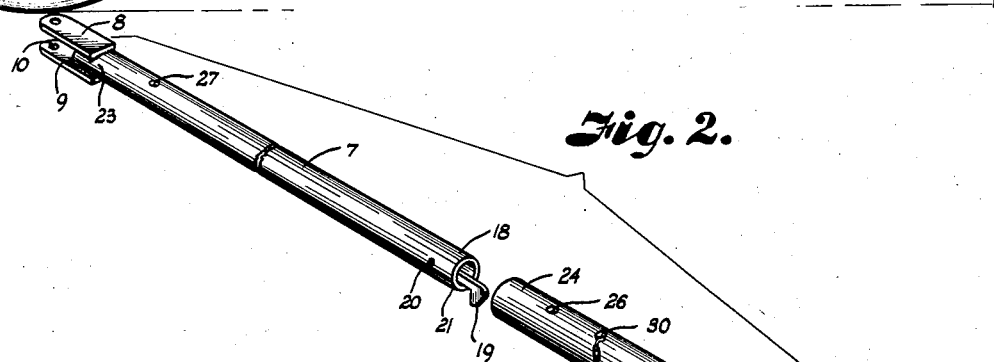
Fig. 2 is a perspective view of the telescoping tubular member and locking latch.
Figure 3:
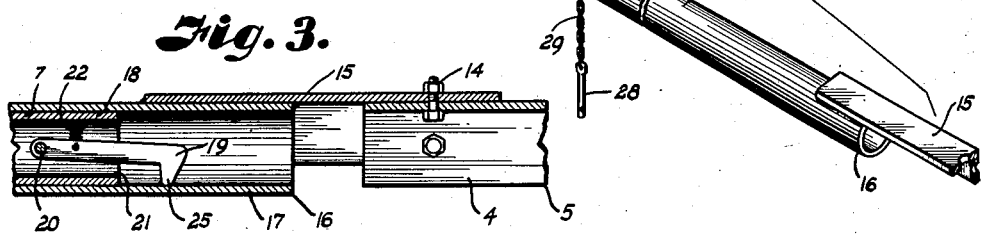
Fig. 3 is a longitudinal cross-sectional view showing the latching member and tubular members in unlatched position.

Referring more in detail to the drawings:

1 designates a hitch embodying the features of my invention having one end attached to a drawbar 2 of a tractor 3, and the other end attached to a tongue 4 of a trailer vehicle or the like 5.

The drawbar of the tractor is usually provided with a transverse pin 6 and held or otherwise rigidly secured to a cylindrical tubular telescoping member 7 are plates 8 and 9 having openings 10 for receiving a pin 11 for attachment to an extension or the like 12 secured to the pin 6 of the drawbar. The tongue 4 of the trailer vehicle may be of the usual type for guiding the front wheels 13 of the trailer or other vehicle and secured to the end thereof by bolts 14 is an angle iron member 15. Welded or otherwise rigidly secured within the angle of the angle iron 15 is an open end 16 of a cylindrical tubular member 17 of slightly larger diameter than the cylindrical tubular member 7 so that the cylindrical tubular member 7 will both rotate and freely slide within the cylindrical tubular member 17. These cylindrical tubular members may be any desired length, but the tubular member 7 must be of a length so that the pawl latching mechanism now to be described will freely operate within the cylindrical tubular member 17.

Pivotally mounted within the end 18 of the tubular member 7 is a latch or pawl 19 having its inner end secured by a pin 20 within the cylindrical tubular member 7. The latch is spring-urged or biased toward the lower side 21 of the tubular member by a coil spring 22. While I have here shown a coil spring for urging the latch downwardly, a flat or other suitable spring may be utilized for the purpose intended.

Figure 4:
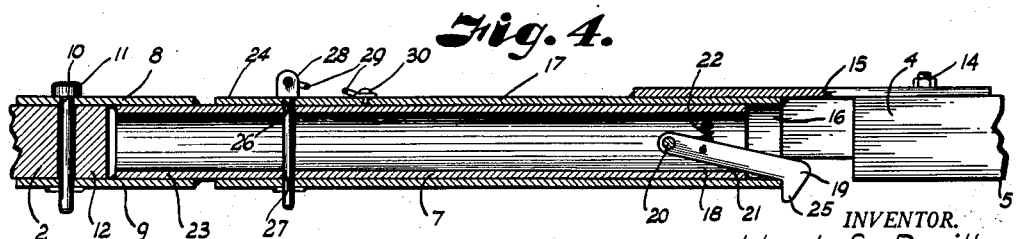
Fig. 4 is a longitudinal cross-sectional view showing the telescoping tubular members in position and the latch engaged with the end of the larger tubular member, and also showing the safety pin in position.

In operation of a hitch constructed and assembled as described, when it is desired to attach the vehicle to the tractor the tractor is backed to an approximate distance of the trailer within which the draft hitch when extended will span. Pawl 19 is then raised to allow extension of the tubular member 18 and the end 23 of the hitch is secured to the tractor drawbar 2 by the pin 11. The free end 18 of the tubular member 7 remains within the end 24 of the tubular member 17. The tractor is then backed and the hook or point 25 of the latch will slide along the bottom side of the tubular member 17 until it passes the end 16 where the spring will urge the latch downwardly to contact the edge of the end 16 of the tubular member 17 as illustrated in Figs. 1 and 4. The hitch then is in operative position for pulling the trailer vehicle. The arrangement of the angle iron 15 and outer cylindrical tubular member 17 is such that the end 16 is unobstructed for a substantial portion whereby the inner and outer cylindrical tubular members 7 and 17 may be relatively rotated and the hook 25 still engage the end 16. This structure permits coupling of the tractor and trailer when they are substantially laterally inclined relative to each other as frequently occurs on uneven ground.

As an additional precaution for locking the hitch, I provide aligned openings 26 and 27 in the respective ends 23 and 24 of the tubular members 7 and 17 for reception of a pin 28 when the openings register. The latching engagement is sufficient for the draft connection, but the pin 28 is a safety member and in the event of accidental dislodgment of the latch from its latching engagement with the tubular member 17 the pin 28 will prevent disengagement of the hitch. The pin 28 is secured to the tubular member 17 by a chain 29 and pin 30. To disengage the hitch the pin 28 is removed, the pawl disengaged by hand from the end 16 of the tubular member 17, and the tubular member 7 withdrawn from the tubular member 17.

It will be obvious from the foregoing that the hitch will allow the operator to hook the trailer to the tractor drawbar without backing of the tractor to the exact distance from the trailer or in the exact position. It may be slightly to one side or laterally inclined and movement of the tubular member 17 and its attachment to the tongue 4 with longitudinal and rotative movement of the tubular member 7 in said member 17 will provide for insertion of the pin 11 for connecting the hitch to the draw bar extension 12 whereby upon backing of the tractor the tubular member 7 further telescope in the tubular member 17 until the hook 25 makes latching engagement with the end 16.

It will further be obvious that the hitch may be utilized in connecting an ensilage trailer to the field cutter and thus eliminate movement of the trailer by hand.

It will further be obvious from the foregoing that I have provided an improved hitch having few working parts to eliminate exact alignment of the vehicle.

What I claim and desire to secure by Letters Patent is:

1. A draft hitch for attaching a trailer vehicle to a tractor having a draw bar, an elongated cylindrical outer member having open ends, an elongated cylindrical inner tubular member extending into one open end of the outer tubular member, said inner tubular member being fitted and adapted to slide longitudinally in the outer tubular member, the other open end of the outer tubular member having a substantially unobstructed end edge, said cylindrical tubular members being adapted for relative rotation, said inner and outer tubular members having at their opposite ends means for detachably connecting them respectively to the tractor draw bar and trailer, a latch member hingedly mounted in the inner tubular member adjacent the end thereof toward said other open end of the outer tubular member and extending therethrough for engaging the unobstructed portion of said end edge when the tubular members are fully contracted in telescopic relation, and means urging said latch member to one side of the inner tubular member whereby when the inner tubular member is fully telescoped within the outer tubular member the latch member will releasably engage the said other end of the outer tubular member to permit substantial relative rotation of the tubular members and for holding said tubular members against relative extension movement.

2. A draft hitch for attaching a trailer vehicle to a tractor having a draw bar, said trailer vehicle having a coupling member, an elongated cylindrical outer tubular member having open ends, a rigid member extending from a portion of said tubular member adjacent one of said open ends and rigidly secured to said coupling with said one open end spaced from the coupling whereby a substantial portion of the end edge of said one open end is unobstructed, an elongated cylindrical inner tubular member fitted and adapted to slide longitudinally in the outer tubular member, said cylindrical tubular members being adapted for relative rotation, means at the end of the inner tubular member opposite said one end of the outer tubular member for detachably and swingably connecting said inner tubular member to the tractor draw bar, a latch member having a laterally extending hook portion hingedly mounted in the inner tubular member adjacent the end thereof toward said one open end of the outer tubular member and said hook portion extending through said open end for engaging on the unobstructed portion of the end edge when the tubular members are fully contracted in telescoped relation, and spring means urging said latch member to one side of the inner tubular member whereby when the inner tubular member is fully telescoped within the outer tubular member the hook portion will releasably engage the said end edge of the outer tubular member in sliding engagement to permit substantial relative rotation of the tubular members and for holding said tubular members against relative extension movement.

References Cited in the file of this patent

UNITED STATES PATENTS

| | | |
|---|---|---|
| 1,536,751 | Barnes | May 5, 1925 |
| 2,357,540 | Palmer | Sept. 5, 1944 |
| 2,415,479 | Forney | Feb. 11, 1947 |
| 2,417,646 | Hallner | Mar. 18, 1947 |
| 2,497,234 | Mylie | Feb. 14, 1950 |
| 2,523,591 | Potter | Sept. 26, 1950 |
| 2,693,368 | Petron | Nov. 2, 1954 |